(12) United States Patent
Tsunoda

(10) Patent No.: US 8,827,108 B2
(45) Date of Patent: Sep. 9, 2014

(54) CUP HOLDER

(75) Inventor: Ryuji Tsunoda, Miyoshi (JP)

(73) Assignee: Nifco Inc., Yokohama-shi (JP)

( * ) Notice: Subject to any disclaimer, the term of this patent is extended or adjusted under 35 U.S.C. 154(b) by 302 days.

(21) Appl. No.: 13/138,836

(22) PCT Filed: Mar. 24, 2010

(86) PCT No.: PCT/JP2010/055089
§ 371 (c)(1),
(2), (4) Date: Dec. 12, 2011

(87) PCT Pub. No.: WO2010/116890
PCT Pub. Date: Oct. 14, 2010

(65) Prior Publication Data
US 2012/0104011 A1  May 3, 2012

(30) Foreign Application Priority Data
Apr. 10, 2009  (JP) .................. 2009-096273

(51) Int. Cl.
*B65D 25/00* (2006.01)
*A47K 1/08* (2006.01)
*B60N 3/10* (2006.01)

(52) U.S. Cl.
CPC ............. *B60N 3/106* (2013.01); *B60N 3/102* (2013.01)
USPC ........... 220/737; 220/830; 220/529; 224/483; 248/311.2

(58) Field of Classification Search
USPC ................ 220/737, 830; 224/483; 248/311.2
See application file for complete search history.

(56) References Cited

U.S. PATENT DOCUMENTS

| 5,190,259 A * | 3/1993 | Okazaki ..................... 248/311.2 |
| 2001/0014993 A1 * | 8/2001 | Orita ................................ 16/82 |
| 2009/0095764 A1 * | 4/2009 | Schaal ......................... 220/737 |

FOREIGN PATENT DOCUMENTS

| JP | H09-071172 | 3/1997 |
| JP | H10-297338 | 11/1998 |
| JP | 2002-144941 | 5/2002 |
| JP | 2003-035994 | 2/2003 |
| JP | 2005-047434 | 2/2005 |
| JP | 2005-053448 | 3/2005 |
| JP | 2006-193883 | 7/2006 |
| JP | 2009-040196 | 2/2009 |

* cited by examiner

*Primary Examiner* — Fenn Mathew
*Assistant Examiner* — James N Smalley
(74) *Attorney, Agent, or Firm* — Manabu Kanesaka

(57) ABSTRACT

When a lid body (36) is opened, a side wall member (22) projects from an upper end face of a circumferential wall of a main body (12), and outside a cup portion (20), a wall portion (24) of the side wall member (22) rises. Specifically, a height of the wall portion (24) capable of supporting a side portion of a container (16) rises. Therefore, for a portion wherein the side wall member (22) rises, a depth of a supporting portion capable of supporting the container (16) is deepened.

5 Claims, 12 Drawing Sheets

CUP HOLDER

RELATED APPLICATIONS

The present application is National Phase of International Application No. PCT/JP2010/055089 filed Mar. 24, 2010, and claims priority from Japanese Application No. 2009-096273, filed Apr. 10, 2009.

FIELD OF TECHNOLOGY

The invention relates to a cup holder provided in an interior of a vehicle and the like.

BACKGROUND ART

In a cup holder provided in a center console of an automobile, a housing portion housing a container is provided, and the housing portion can be opened and closed by a lid body.

For example, in Patent Document 1, inside a cylinder portion which is provided in a main body and can house the container, a container receiving plate in which four leg pieces are provided can be housed. According to a height of the container housed inside the cylinder portion, the container receiving plate is turned upside down.

Also, in Patent Document 2, a bottom receiving member which can support the container is provided in the lid body, and supported so as to be capable of inclining and falling into the cylinder portion of the main body. According to the height of the container housed inside the cylinder portion, the bottom receiving member inclines and falls, or stands up.

PRIOR ART DOCUMENT

Patent Document

Patent Document 1: Japanese Patent Application Publication No. 2003-35994
Patent Document 2: Japanese Patent Application Publication No. 2006-193883

SUMMARY OF THE INVENTION

Problems to be Solved by the Invention

In light of the above-mentioned facts, the present invention provides a cup holder which can support the container such as a plastic bottle and the like, and wherein the height of the main body is made as small as possible.

Device for Solving the Problems

In a first aspect of the present invention, there is provided a cup holder comprising a main body wherein a housing portion housing a container is provided; a lid body movably provided in the main body, and opening and closing an opening of the housing portion; a side wall member provided so as to be capable of moving up and down inside the housing portion, and supporting a side portion of the container housed inside the housing portion; and a conversion mechanism converting an opening and closing motion of the lid body to an up-and-down moving motion of the side wall member.

In the aspect, relative to the main body in which the housing portion is provided, the lid body is movably provided, and by the lid body, the opening of the housing portion is opened and closed. Inside the housing portion, the side wall member is provided so as to be capable of moving up and down, and supports the side portion of the container housed inside the housing portion. Here, by the conversion mechanism, the opening and closing motion of the lid body is converted to the up-and-down moving motion of the side wall member.

Thereby, the side wall member moves up and down by interlocking with the opening and closing motion of the lid body. However, the side wall member can rise from the main body in a state wherein the side wall member is moved upward. In this state, the side portion of the container inside the housing portion can be supported by the side wall member.

Specifically, here, when the lid body is opened, the side wall member rises upward, so that for a portion wherein the side wall member rose, a depth of a supporting portion capable of supporting the container is deepened. Consequently, the container such as a plastic bottle and the like with a height higher than that of a can, is also supported in a stable state.

Also, when the lid body is closed, the side wall member moves downward and is housed inside the housing portion, so that the height of the main body can be lowered as compared to a conventional one.

As for a second aspect of the present invention, in the first aspect of the present invention, the conversion mechanism may comprise a supporting arm supporting the lid body; a first rack provided along a height direction of the main body, engaging a first gear provided in an end portion of the supporting arm, and opening and closing the lid body while the first gear is being rotated; and a second rack provided in the side wall member, engaging the first gear, and moving the side wall member up and down by a rotation of the first gear.

In the structure, the lid body is supported by the supporting arm, and in the end portion of the supporting arm, the first gear is provided. On the other hand, in the main body, the first rack is provided along the height direction, engages the first gear, and opens and closes the lid body by moving the first gear up and down along the first rack while the first gear is being rotated. Also, in the side wall member, the second rack engaging the first gear is provided, and due to the rotation of the first gear, the side wall member moves up and down through the second rack. Specifically, the side wall member moves up and down by interlocking with the opening and closing motion of the lid body.

As for a third aspect of the present invention, in the first aspect of the present invention, in the housing portion, a cup portion supporting the container inside the side wall member may be provided. In the side wall member, a supporting piece, housed by abutting against the cup portion in a state wherein the lid body is closed, and projecting to the cup portion side by an opening motion of the lid body, may be provided.

In the structure, the cup portion supporting the container is provided inside the side wall member. Also, in the side wall member, the supporting piece, housed by abutting against the cup portion in the state wherein the lid body is closed, is provided, and by the opening motion of the lid body, the supporting piece projects to the cup portion side. Thereby, even in a case wherein an outer diameter size of the container has a smaller diameter than an inner diameter size of the cup portion, the supporting piece abuts against a side wall of the container so as to be capable of controlling a movement of the container in a horizontal direction, and supporting the container in the stable state.

As for a fourth aspect of the present invention, in the second aspect of the present invention, a reversing spring whose one end portion is attached to the main body, and whose other end portion is attached to the second rack may be provided. When the lid body is opened at a predetermined angle or above, the reversing spring urges in a direction moving the second rack upward, and when the lid body is closed at the predetermined angle or less, the reversing spring urges in a direction moving the second rack downward.

In the structure, one end portion of the reversing spring is attached to the main body, and the other end portion of the reversing spring is attached to the second rack so as to change a direction operating an urging force of the reversing spring in a course of opening and closing of the lid body. Thereby, when the lid body is opened at a predetermined angle or above, the reversing spring urges the second rack in the direction moving upward so as to be capable of opening the lid body, and when the lid body is closed at the predetermined angle or less, the reversing spring urges the second rack in the direction moving downward so as to be capable of closing the lid body.

As for a fifth aspect of the present invention, in the first aspect of the present invention, a damper gear may be provided in the side wall member, and engaged with a third rack provided in the main body.

According to the structure, by providing the damper gear in the side wall member, and engaging with the third rack of the main body, when the side wall member is moved up and down, a speed of the side wall member is reduced, and the side wall member can be moved slowly. Since the side wall member and the lid body are associated by the conversion mechanism, by moving the side wall member slowly, the lid body can be moved slowly. Thereby, the cup holder can be provided with a high class feeling.

As for a sixth aspect of the present invention, in the first aspect of the present invention, a locking mechanism, locking the lid body in the main body in a state wherein the lid body is closed, is provided. When the lid body is pressed, a locked state is released, and also the locking mechanism urges in a direction opening the lid body.

In the structure, the locking mechanism, locking the lid body in the main body in the state wherein the lid body is closed, is provided, and when the lid body is pressed in the state wherein the lid body is closed, the locked state is released, and the lid body is urged in an opening direction, so that it is convenient compared to a case in which the lid body is opened by hooking a free end portion of the lid body by one's fingers.

Effect of the Invention

Since the present invention has the above-mentioned structure, the present invention can support the container such as the plastic bottle and the like, and the height of the main body can be made as small as possible.

BEST MODES OF CARRYING OUT THE INVENTION

Hereinafter, a cup holder according to an embodiment of the present invention will be explained.

Figure 1:
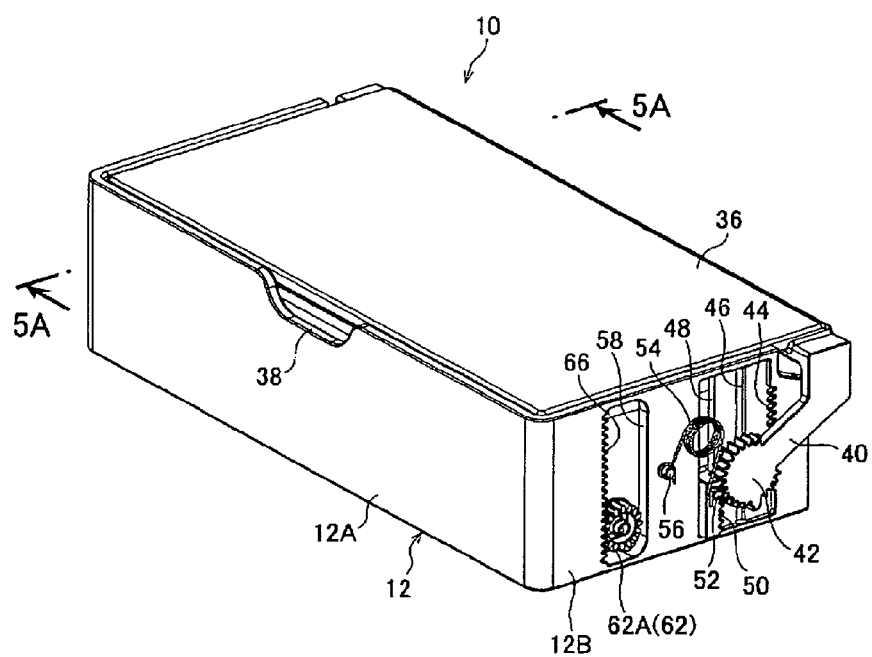
FIG. 1 is a perspective view showing a closed state of a lid body of a cup holder according to the present embodiment.
Figure 2:
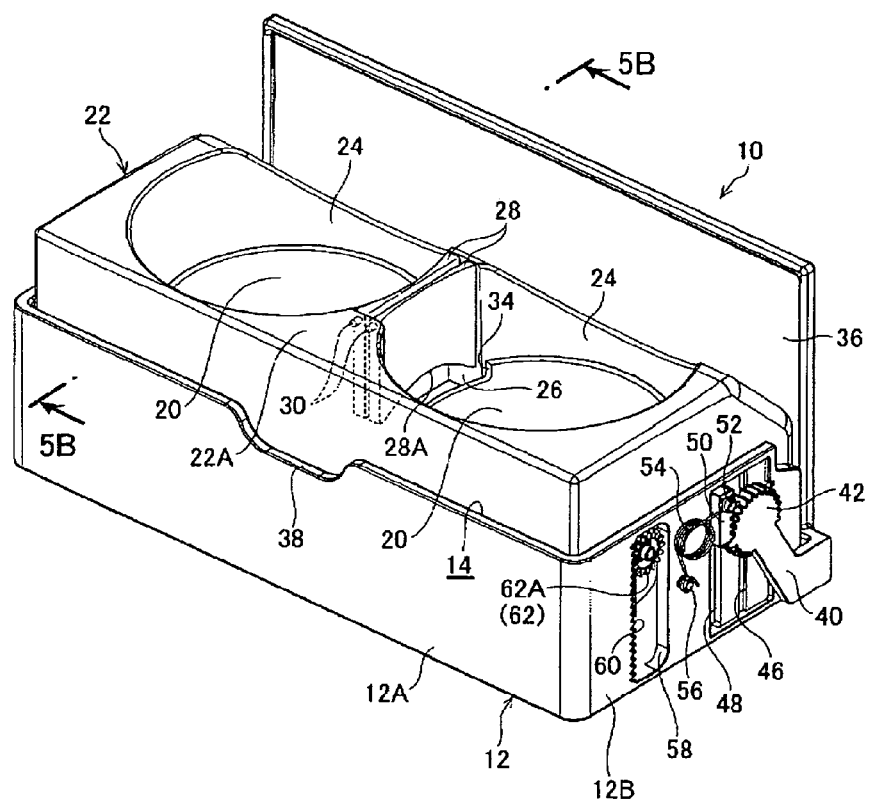
FIG. 2 is a perspective view showing a completely opened state of the lid body of the cup holder according to the present embodiment.

Although it is not shown in the figures, a cup holder 10 shown in FIGS. 1 and 2 is disposed in a center console disposed between a driver's seat and a front passenger seat of a vehicle, and can be housed inside a depressed portion provided in the center console.

Structure of Cup Holder

Figure 3:
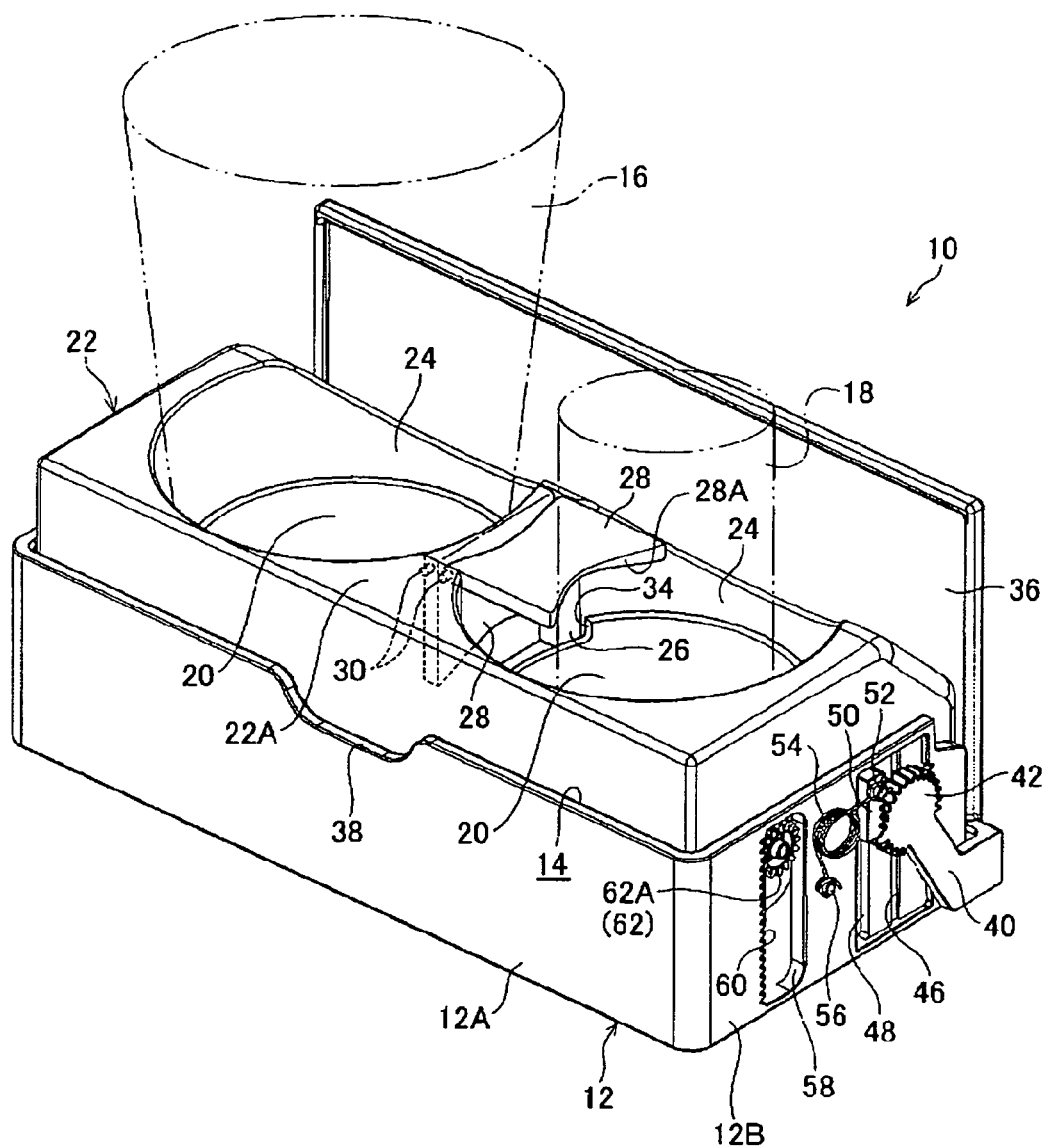
FIG. 3 is a perspective view explaining an operation of the cup holder according to the present embodiment.

As shown in FIGS. 1 to 3, the cup holder 10 comprises a main body 12 forming a box shape, and inside a housing portion 14 of the main body 12, cylindrical cup portions 20 (here, two) which can support containers 16, 18 (see FIG. 3) are disposed along a longitudinal direction of the housing portion 14. A side wall member 22 is provided between outer circumferential faces of the cup portions 20 and a circumferential wall of the main body 12.

The side wall member 22 forms an approximately box shape whose bottom face is an upper face 22A, and can be housed inside the housing portion 14. Also, from the upper face 22A of the side wall member 22, cylindrical wall portions 24, which are inserted to the cup portions 20 from outside, hang in positions corresponding to the cup portions 20.

Figure 5A:
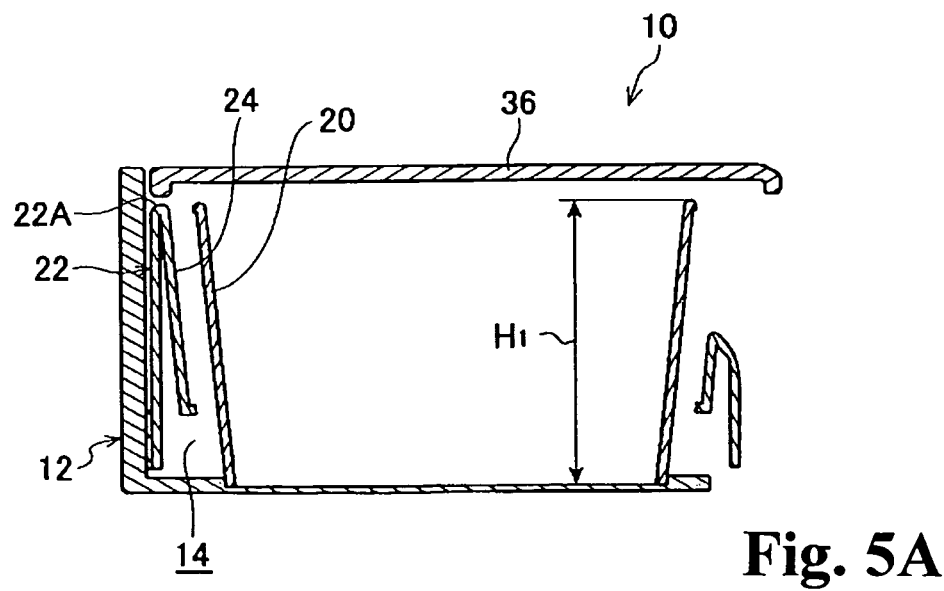
FIG. 5A is a cross-sectional view of a line 5A-5A of FIG. 1.
Figure 5B:
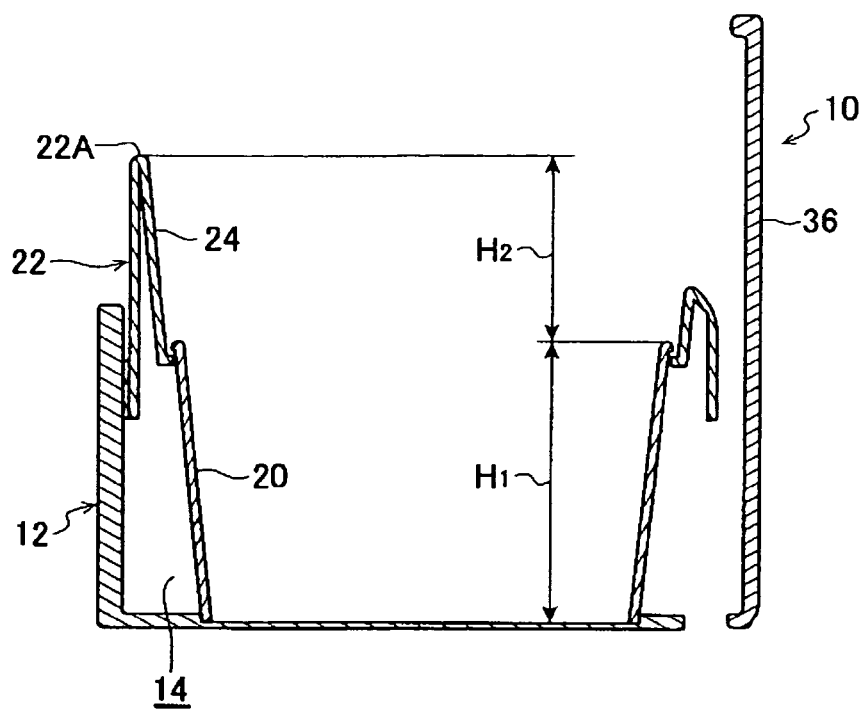
FIG. 5B is a cross-sectional view of a line 5B-5B of FIG. 1.

Moreover, the side wall member 22 can move up and down relative to the main body 12 (described hereinafter), and as shown in FIG. 5(A), in a state wherein the side wall member 22 is positioned in the lowermost part (state wherein a lid body 36 is closed), the upper face 22A of the side wall member 22 is disposed in an approximately one surface of an end face of the cup portion 20, and as shown in FIG. 5(B), in a state wherein the side wall member 22 is positioned in the uppermost part (state wherein the lid body 36 is completely opened), the upper face 22A of the side wall member 22 is disposed in a position higher than the end face of the cup portion 20.

Also, as shown in FIG. 2, a notch portion 26 is provided between the wall portion 24 and the wall portion 24 of the side wall member 22, and inside the notch portion 26, in a state wherein a pair of flaps (supporting pieces) 28 formed by a rectangle-shaped plate material is housed, the respective flaps 28 constitute one portion of the wall portions 24.

On upper portions of both side walls of the flaps 28, shafts 30 are provided. The shafts 30 are fitted into shaft holes (omitted in the figures) provided in an upper portion of the notch portion 26, and rotatably supported. The shafts 30 can maintain a predetermined rotational angle due to a sliding resistance with the shaft holes. Also, in the shafts 30, an abutting portion (omitted in the figures) is provided, and by abutting against a stopper (omitted in the figures) provided inside the shaft hole, the shafts 30 can rotate within a range of approximately 0 to 90 degrees.

As shown in FIG. 3, in a case wherein an outer diameter size of the container 18 inserted into the cup portion 20 has a smaller diameter than an inner diameter size of the cup portion 20, by projecting the flap 28 to an inside of the wall portion 24, the flap 28 abuts against a side face of the container 18 so as to be capable of supporting the container 18. Here, on an end portion of the flap 28, a concave arc portion 28A, including a curvature which is conformed to the small-diameter container 18 such as a can and the like, is provided.

Also, as shown in FIG. 5(A), in the state wherein the side wall member 22 is positioned in the lowermost part, the upper face 22A of the side wall member 22 is disposed in the approximately one surface of the end face of the cup portion 20, so that in a state wherein the flaps 28 are opened at 90 degrees, when the side wall member 22 is moved to the lowermost part, the flaps 28 interfere with upper end portions of the cup portions 20.

Figure 4:
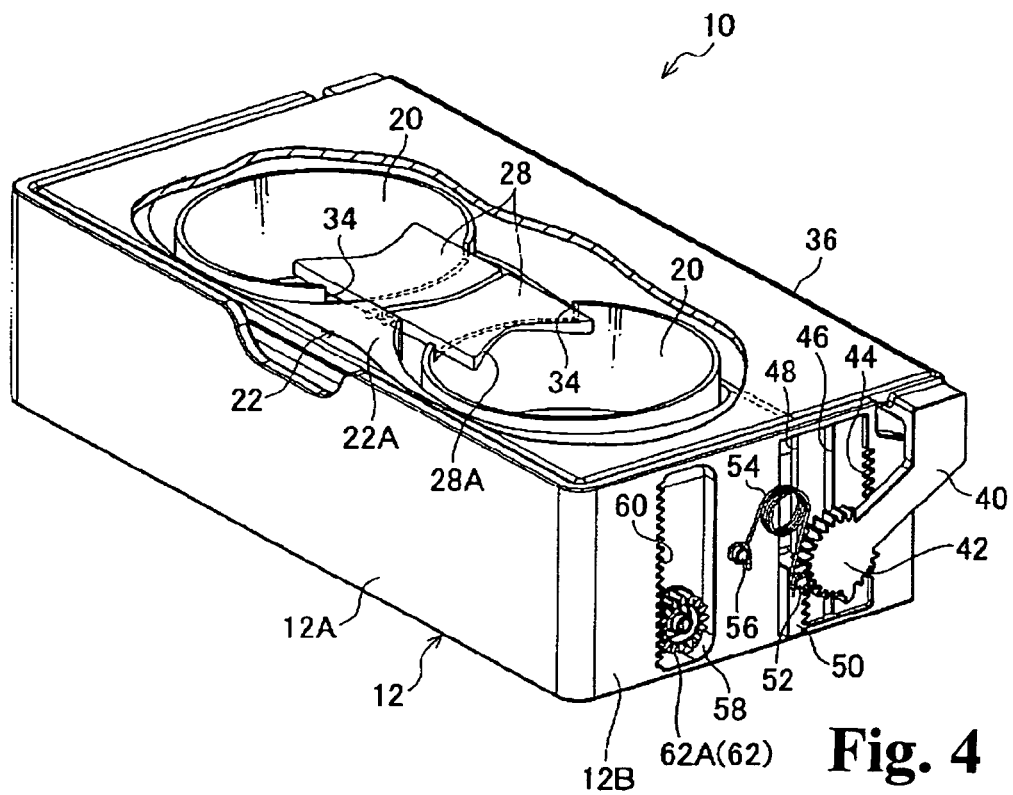
FIG. 4 is a partially broken view explaining the operation of the cup holder according to the present embodiment.

Consequently, as shown in FIG. 2, on a notch portion 26 side of the side wall member 22 of the upper end portion of the cup portion 20, a notch portion 34 for a thickness of the flap 28 is provided. As shown in FIG. 4, in the state wherein the side wall member 22 is positioned in the lowermost part, interference with the flaps 28 in a state opened at 90 degrees and the cup portions 20 is prevented.

On the other hand, as shown in FIGS. 1 and 2, the cup holder 10 comprises the long-plate-like lid body 36, and the lid body 36 can be opened and closed relative to the main body 12 with a focus on one end portion of a width direction of the lid body 36. In an upper end center part of a front wall 12A of the main body 12, a notch portion 38 is formed, and through the notch portion 38, a free end portion of the lid body 36 can be hooked by one's fingers.

From one end portion of the width direction of the lid body 36, a supporting arm 40 (conversion mechanism) extends obliquely downward on the other end portion side of the width direction of the lid body 36. On an end portion of the supporting arm 40, a gear (first gear, conversion mechanism) 42 is provided, and on a reverse side of the gear 42, although it is not shown in the figures, an engaging projection is provided.

Figure 6:
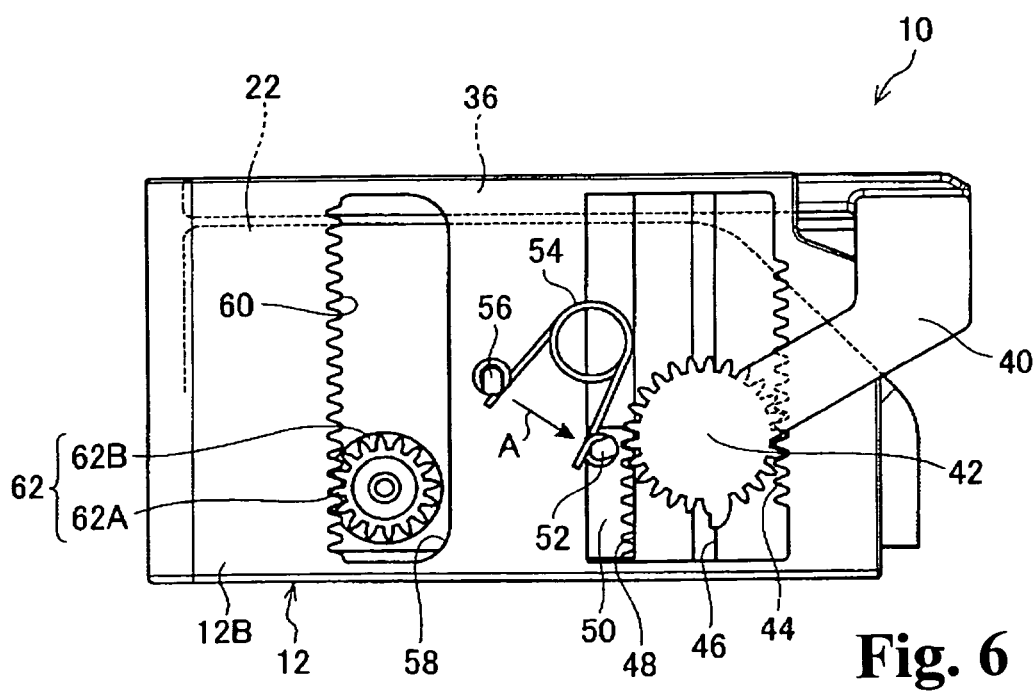
FIG. 6 is a side view showing the closed state of the lid body of the cup holder according to the present embodiment.

On the other hand, as shown in FIGS. 1, 2, and 6, on a side wall 12B of the main body 12, a rack (first rack, conversion mechanism) 44 is formed along a height direction of the main body 12, and the gear 42 can engage the rack 44. Also, in the side wall 12B of the main body 12, an engaging groove 46 is formed parallel to the rack 44. The engaging projection provided in the gear 42 can engage the engaging groove 46, and through the engaging projection and the engaging groove 46, the gear 42 is guided.

When the lid body 36 is opened and closed, the gear 42 rotates through the supporting arm 40, and also the gear 42 moves up and down along the rack 44. Thereby, a position of a shaft portion of the supporting arm 40 changes, and in a state wherein the lid body 36 is opened, the lid body 36 can be moved to a back face side of the main body 12.

Also, in the side wall 12B of the main body 12, an opening portion 48 is provided parallel to the rack 44, and passes through the side wall 12B. From the opening portion 48, a rack (second rack, conversion mechanism) 50 provided in the side wall 12B of the side wall member 22 is exposed. The rack 50 engages the gear 42 of the supporting arm 40, and by a rotation of the gear 42 due to opening and closing of the lid body 36, the side wall member 22 is moved up and down through the rack 50. Specifically, the side wall member 22 moves up and down by interlocking with opening and closing movements of the lid body 36.

In the rack 50, an attachment portion 52 is provided, and one end portion of a reversing spring 54 is attached. The other end portion of the reversing spring 54 is attached to an attachment portion 56 provided in a center part of a height direction of the side wall 12B of the main body 12. Due to the reversing spring 54; a direction of an urging force by the reversing spring 54 changes at a position of the rack 50.

Specifically, a position of the attachment portion 52 is moved in a direction approaching the attachment portion 56, an urging force is accumulated in the reversing spring 54, so that when the attachment portion 52 moves in a direction away from the attachment portion 56, the urging force (restoring force) due to the reversing spring 54 operates.

Figure 7:
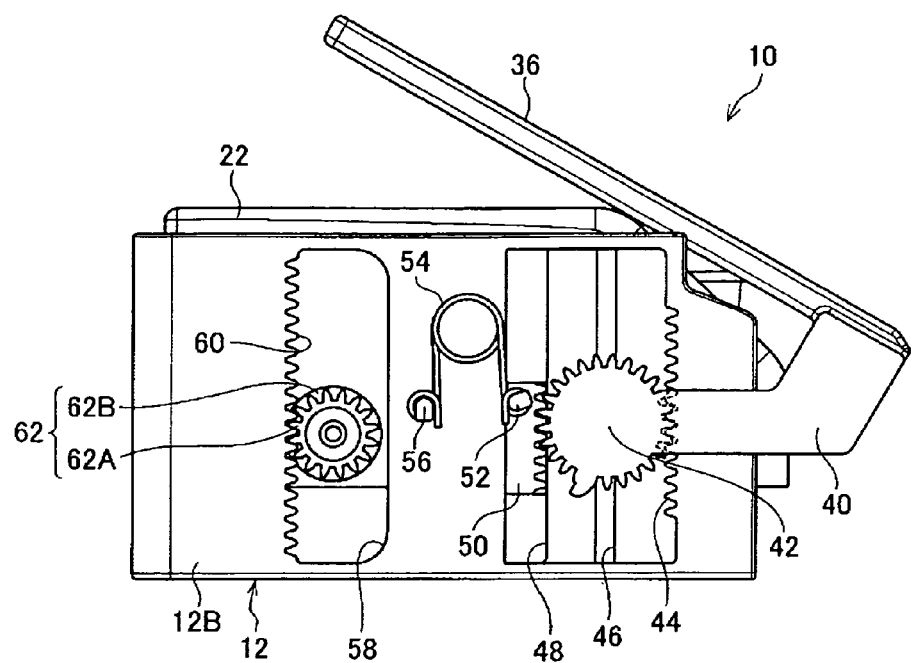
FIG. 7 is a side view showing an open state of the lid body of the cup holder according to the present embodiment at 30 degrees.
Figure 8:
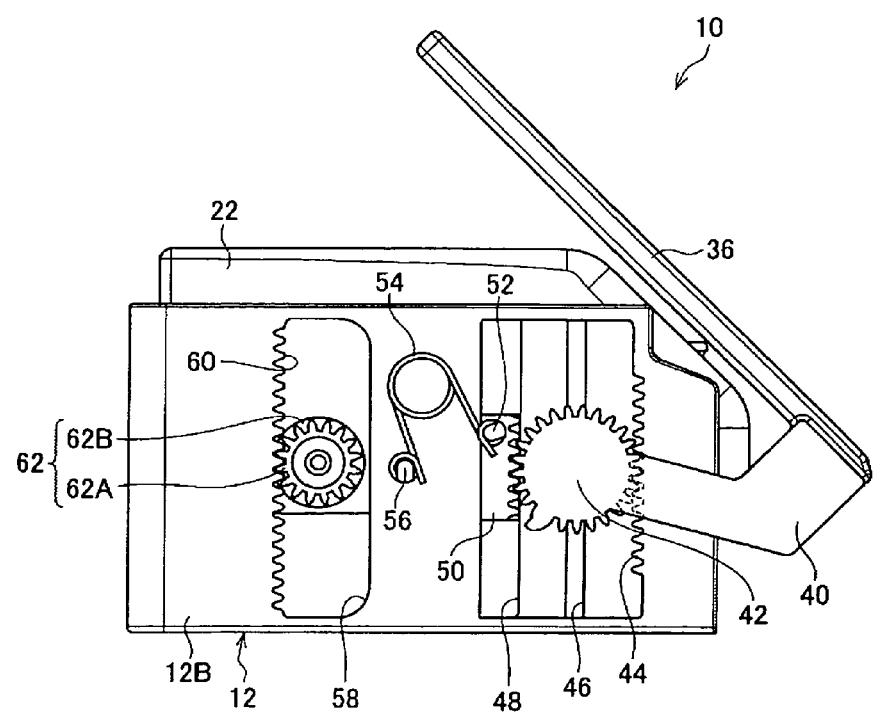
FIG. 8 is a side view showing an open state of the lid body of the cup holder according to the present embodiment at 45 degrees.

As one example, in a range wherein an open angle of the lid body 36 is between 30 degrees (see FIG. 7) and 60 degrees (see FIG. 9), the urging force is accumulated in the reversing spring 54, and in a range wherein the open angle of the lid body 36 is 60 degrees or above, or the open angle of the lid body 36 is 30 degrees or less, the urging force due to the reversing spring 54 operates. Incidentally, FIG. 8 shows a state wherein the open angle of the lid body 36 is approximately 45 degrees.

Figure 11:
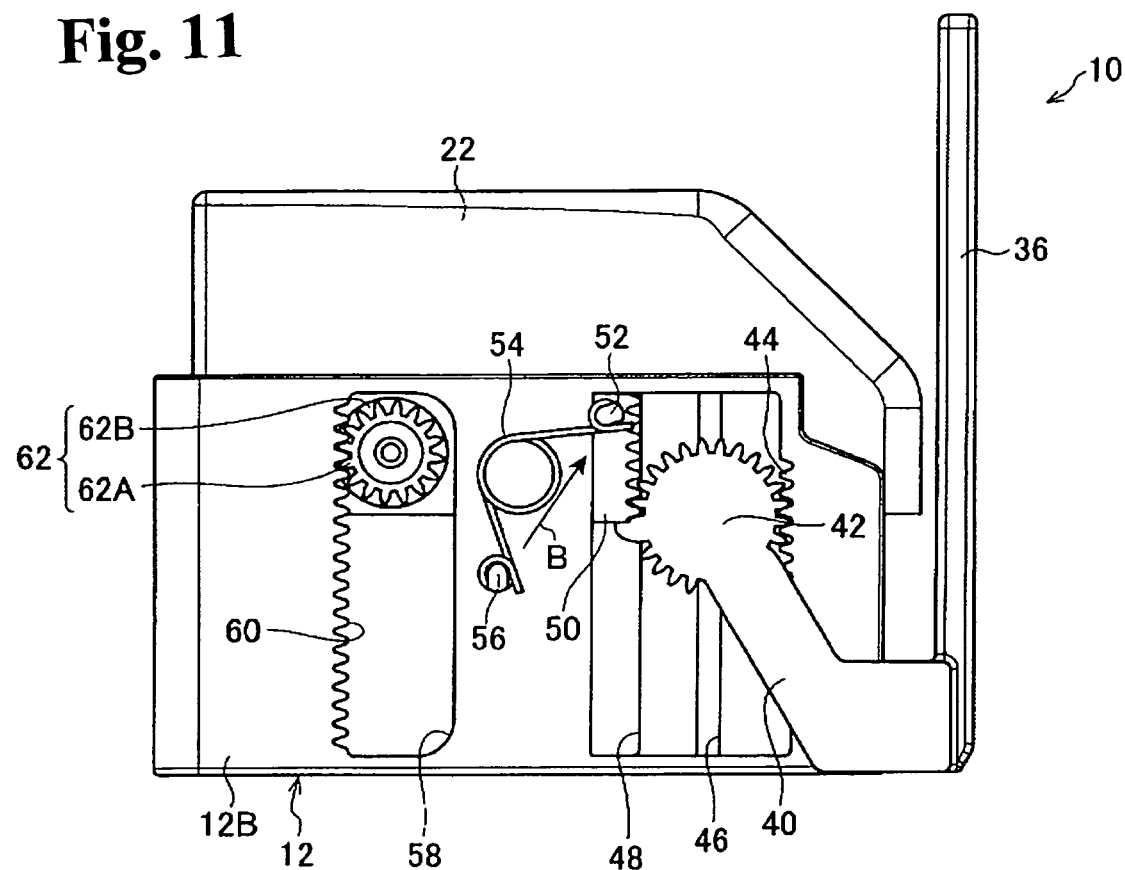
FIG. 11 is a side view showing the full open state of the lid body of the cup holder according to the present embodiment.

Then, as shown in FIG. 11, in a full open state of the lid body 36, an urging force in an arrow B direction acts on the reversing spring 54, and by the urging force, the rack 50 is pressed up through the attachment portion 52, and the lid body 36 is urged in an opening direction through the supporting arm 40. Also, as shown in FIG. 6, in a closed state of the lid body 36, an urging force in an arrow A direction acts on the reversing spring 54, and by the urging force, the rack 50 is pressed down through the attachment portion 52, and the lid body 36 is urged in a closing direction through the supporting arm 40.

Incidentally, the angles can be adjusted by changing positions of the attachment portions 52, 56 of the reversing spring 54.

On the other hand, as shown in FIGS. 1, 2, and 6, in the side wall 12B of the main body 12, an opening portion 58 is provided parallel to the opening portion 48, and passes through the side wall 12B. In the opening portion 58, a rack 60 (third rack) is formed parallel to the rack 44, and a gear portion 62A of a damper gear 62 provided in the side wall 12B of the side wall member 22 engages the rack 60.

In a housing 62B of the damper gear 62, a viscous fluid such as silicon oil and the like is filled up. A viscous resistance due to the viscous fluid operates in the gear portion 62A for both a positive rotation and an inverse rotation, and a damping force due to the viscous resistance operates.

Operation of Cup Holder

As shown in FIGS. 1 and 6, from a state wherein the lid body 36 is closed, the free end portion of the lid body 36 is hooked by one's fingers through the notch portion 38 formed in the main body 12, so that the lid body 36 is moved in the opening direction. Thereby, as shown in FIGS. 7 and 8, the gear 42 of the supporting arm 40 moves upward along the rack 44 of the main body 12 while the gear 42 is rotating.

When the gear 42 of the supporting arm 40 rotates due to a movement in the opening direction of the lid body 36, the rack 50 moves upward. Through the rack 50, the side wall member 22 moves upward. Here, since the gear 42 moves upward while the gear 42 is rotating, a moving speed of the rack 50 becomes faster compared to a case wherein the rack 50 moves by the rotation of the gear 42.

Figure 9:
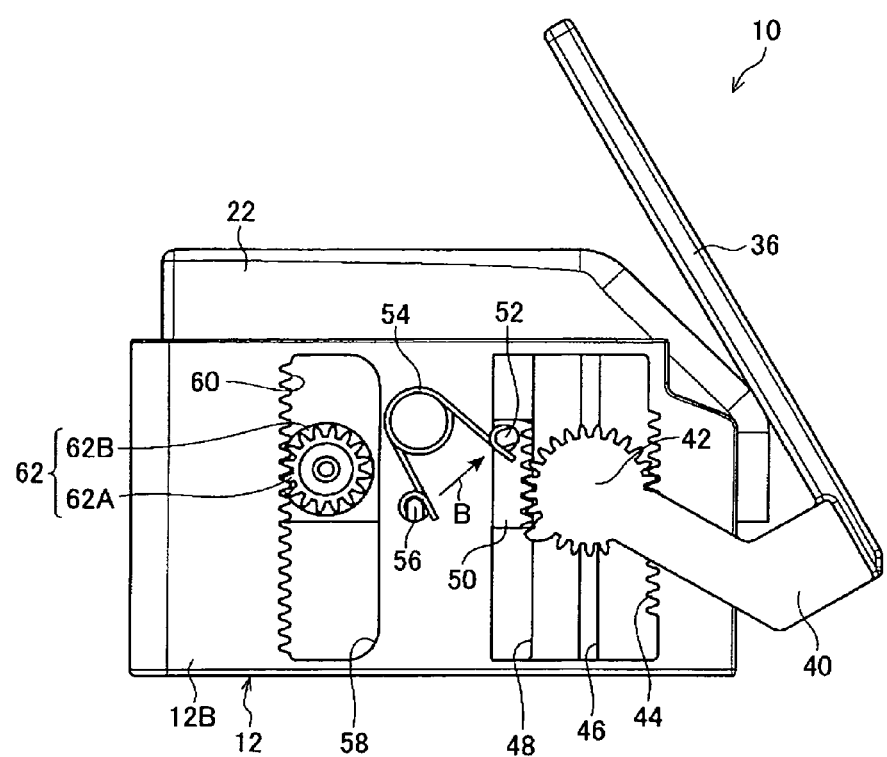
FIG. 9 is a side view showing an open state of the lid body of the cup holder according to the present embodiment at 60 degrees.
Figure 10:
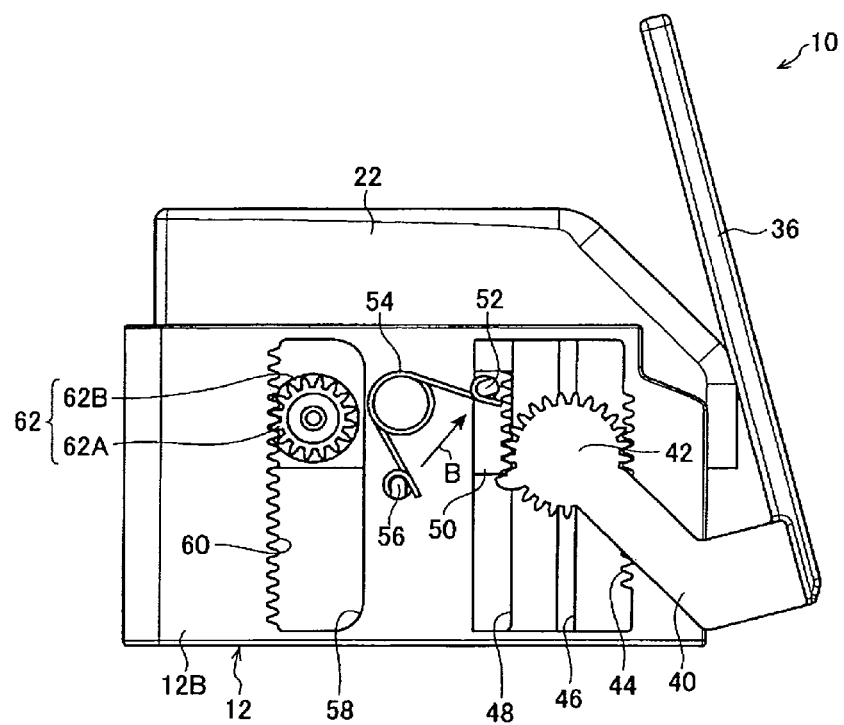
FIG. 10 is a side view showing an open state of the lid body of the cup holder according to the present embodiment at 75 degrees.

As shown in FIGS. 9 to 11, when the open angle of the lid body 36 is 60 degrees or above, the attachment portion 52 of the reversing spring 54 is disposed obliquely upward on the attachment portion 56 of the reversing spring 54. An urging force urging the attachment portion 52 in the arrow B direction operates in the reversing spring 54 as the basis of the attachment portion 56. Incidentally, FIG. 10 shows a state wherein the open angle of the lid body 36 is approximately 75 degrees.

Consequently, the gear 42 of the supporting arm 40 is rotated through the attachment portion 52 and the rack 50, and also moved upward. Specifically, the lid body 36 is urged in the opening direction by the reversing spring 54, and automatically opened.

Here, in the side wall 12B of the side wall member 22, the damper gear 62 is provided, and the rack 60, formed in the opening portion 58 of the side wall 12B of the main body 12, engages the gear portion 62A of the damper gear 62. Consequently, due to a movement of the side wall member 22, the gear portion 62A rotates through the rack 60. Therefore, a damping force due to the damper gear 62 operates on the side wall member 22 through the gear portion 62A, so that the side wall member 22 moves quietly. Thereby, the cup holder 10 can provide a high class feeling.

Then, as shown in FIG. 11, in the state wherein the lid body 36 is completely opened, due to the urging force of the reversing spring 54 and the lid body 36's own weight, the full open state of the lid body 36 is maintained.

However, in the present embodiment, as shown in FIGS. 4 and 5(A), in the state wherein the lid body 36 is closed, although the upper face 22A of the side wall member 22 is disposed on approximately one surface of the end face of the cup portion 20, as shown in FIGS. 2 and 5(B), when the lid body 36 is opened, the side wall member 22 projects from an upper end face of the circumferential wall of the main body 12, and on the outside of the cup portion 20, the wall portion 24 of the side wall member 22 rises.

Specifically, a height of the wall portion 24 capable of supporting a side portion of the container 16 rises. Therefore, for a portion ($H_2$) wherein the side wall member 22 rises, a depth ($H_1+H_2$) of a supporting portion capable of supporting the container 16 increases. Consequently, as shown in FIG. 3, the container 16 such as a plastic bottle and the like with a height higher than that of the can, can be also supported in a stable state.

Then, in the state wherein the lid body 36 is opened, the flaps 28 can be rotated, and projected to the inside of the wall portions 24. Thereby, even in a case wherein the container inserted into the cup portion 20 has a small diameter, the flap 28 abuts against the side face of the container 18 so as to be capable of supporting the container 18.

Also, as shown in FIG. 4, in a state wherein the flaps 28 remain projected to the inside of the wall portions 24, the side wall member 22 can move. Consequently, when the lid body 36 is opened, there is a case in which the flaps 28 are projected to the inside of the wall portions 24. However, in a case when the flaps 28 are unnecessary, the flaps 28 may be pressed down, and housed in the notch portion 26 of the side wall member 22.

Next, the lid body 36 is moved in the closing direction. Thereby, as shown in FIGS. 10 to 7, the gear 42 of the supporting arm 40 moves downward along the rack 44 of the main body 12 while the gear 42 is rotating. Due to a movement in the closing direction of the lid body 36, when the gear 42 of the supporting arm 40 rotates, the rack 50 moves downward.

Although the side wall member 22 moves downward through the rack 50, when the open angle of the lid body 36 is approximately 30 degrees or less, the attachment portion 52 of the reversing spring 54 is disposed obliquely downward on the attachment portion 56 of the reversing spring 54, and the urging force urging the attachment portion 52 in the arrow A direction operates in the reversing spring 54 as the basis of the attachment portion 56 (see FIG. 6).

Consequently, the gear 42 of the supporting arm 40 is rotated through the attachment portion 52 and the rack 50, and also moved downward. Specifically, the lid body 36 is urged in the closing direction by the reversing spring 54, and automatically closed. Then, as shown in FIG. 6, in the state wherein the lid body 36 is closed, due to the urging force of the reversing spring 54 and the side wall member 22's own weight, the closed state of the lid body 36 is maintained.

In the present embodiment, as shown in FIG. 5, when the lid body 36 is closed, the side wall member 22 moves downward, and is housed inside the housing portion 14, so that as a height of the main body 12, only a height ($H_1$) portion of the cup portion 20 is required to be ensured. Accordingly, the height of the main body 12 can be lowered compared to a conventional one.

Other Embodiment

In the present embodiment, as shown in FIG. 3, the flaps 28 are manually projected or housed. However, the flaps 28 may be projected or housed by interlocking with an up-and-down movement of the side wall member 22.

Figure 12A:
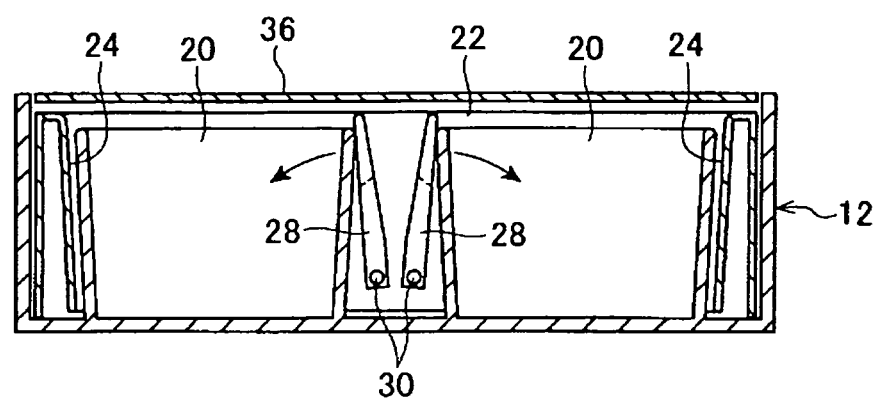
FIG. 12A is a cross-sectional view showing a first modified example of the cup holder according to the present embodiment.
Figure 12B:
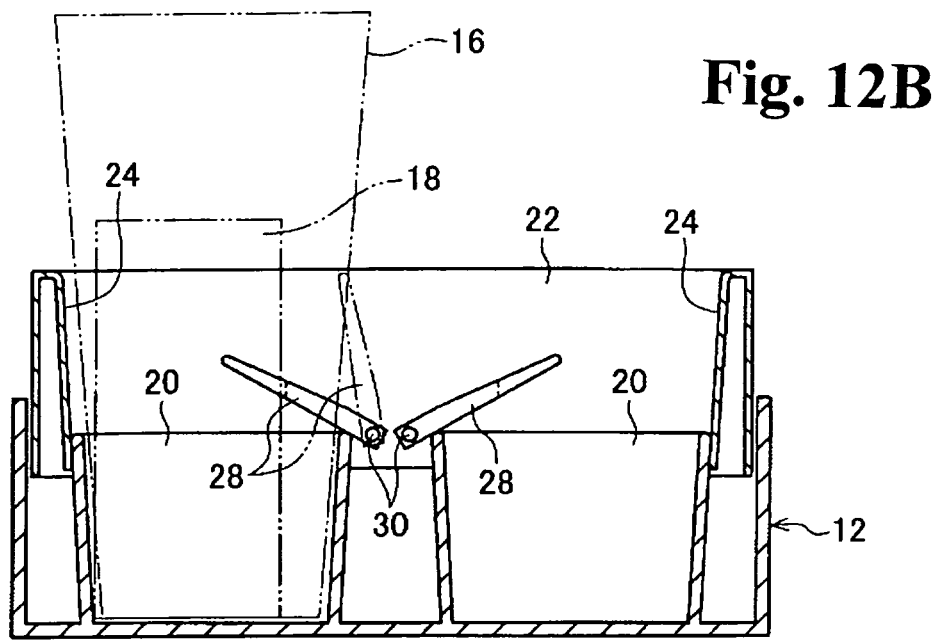
FIG. 12B is a cross-sectional view showing the first modified example of the cup holder according to the present embodiment.

For example, as shown in FIGS. 12(A) and 12(B), the shafts 30 of the flaps 28 are provided in lower portions of both side walls of the flaps 28. Although it is not shown in the figures, a torsion spring is placed in the shafts 30, so that an urging force acts in directions (arrow directions) wherein the flaps 28 project to the inside of the wall portions 24.

In a state wherein the side wall member 22 is disposed in a lower portion, upper portions of the flaps 28 abut against the upper end portions of the cup portions 20, so that a movement thereof is controlled. However, when the side wall member 22 moves upward, the flaps 28 move upward together with the side wall member 22, so that positions of the flaps 28 abutting against the upper end portions of the cup portions 20 move downward, and movements of the flaps 28 are controlled in a state wherein the flaps 28 are gradually projected to the inside of the wall portions 24.

Also, when the lid body 36 is closed, the side wall member 22 moves downward, and the flaps 28 move downward. However, the positions of the flaps 28 abutting against the upper end portions of the cup portions 20 move downward. Thereby, the flaps 28 gradually stand up, and are housed inside the notch portion 26 of the side wall member 22.

Figure 13A:
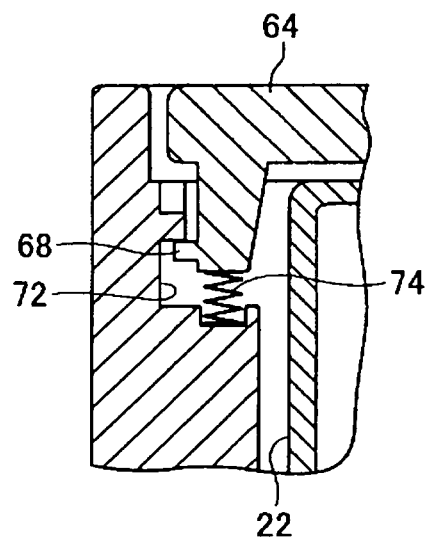
FIG. 13A is a cross-sectional view showing a second modified example of the cup holder according to the present embodiment.
Figure 13B:
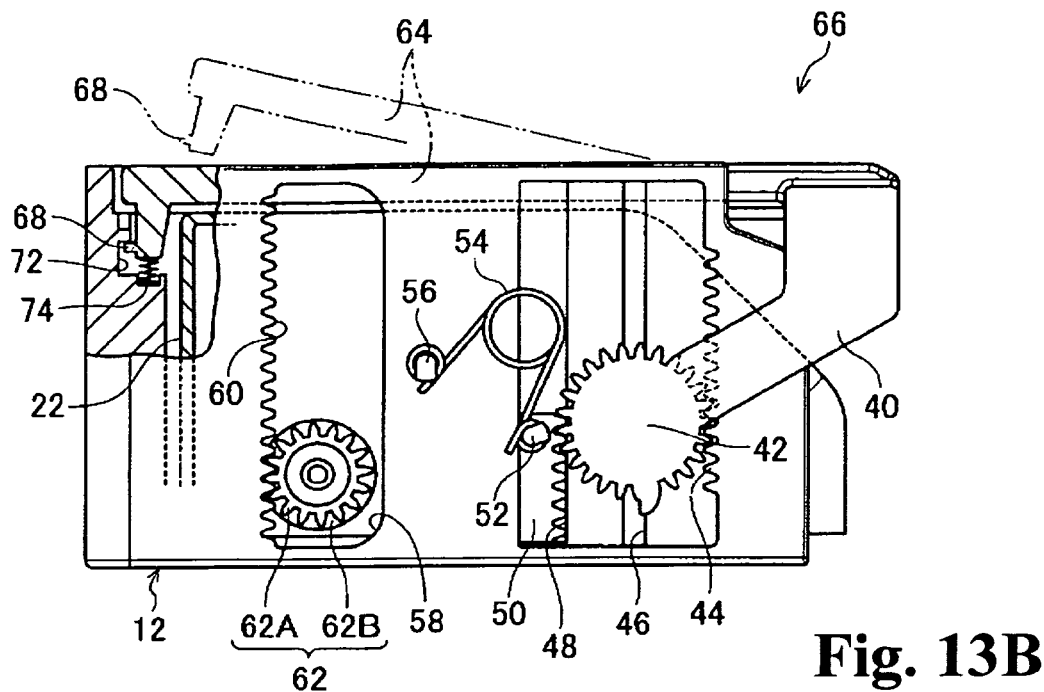
FIG. 13B is a cross-sectional view showing the second modified example of the cup holder according to the present embodiment.

Also, in the present embodiment, the cup holder 10 in which the lid body 36 is manually moved in the opening direction was explained. However, for example, as shown in FIGS. 13(A) and 13(B), the present embodiment may be applied to a cup holder 66 in which a lid body 64 is made as, i.e., a push and open type.

In this case, as one example, a pin (locking mechanism) 68 is provided in the lid body 64, and a heart-shaped cam (locking mechanism) 72 wherein the pin 68 can lock and which is provided in a well-known latch device is formed in a main body 70. Also, on a free end side of the lid body 64, a spring (locking mechanism) 74 is provided, and urges in a direction opening the lid body 64.

In a state wherein the pin 68 is locked in the heart-shaped cam 72, the lid body 64 is in the closed state. From this state, when the free end side of the lid body 64 is pressed, an urging force is accumulated in the spring 74, and also the pin 68 comes free from the heart-shaped cam 72, so that a locked state is released. Thereby, due to the urging force of the spring 74, the lid body 64 is opened.

Figure 14:
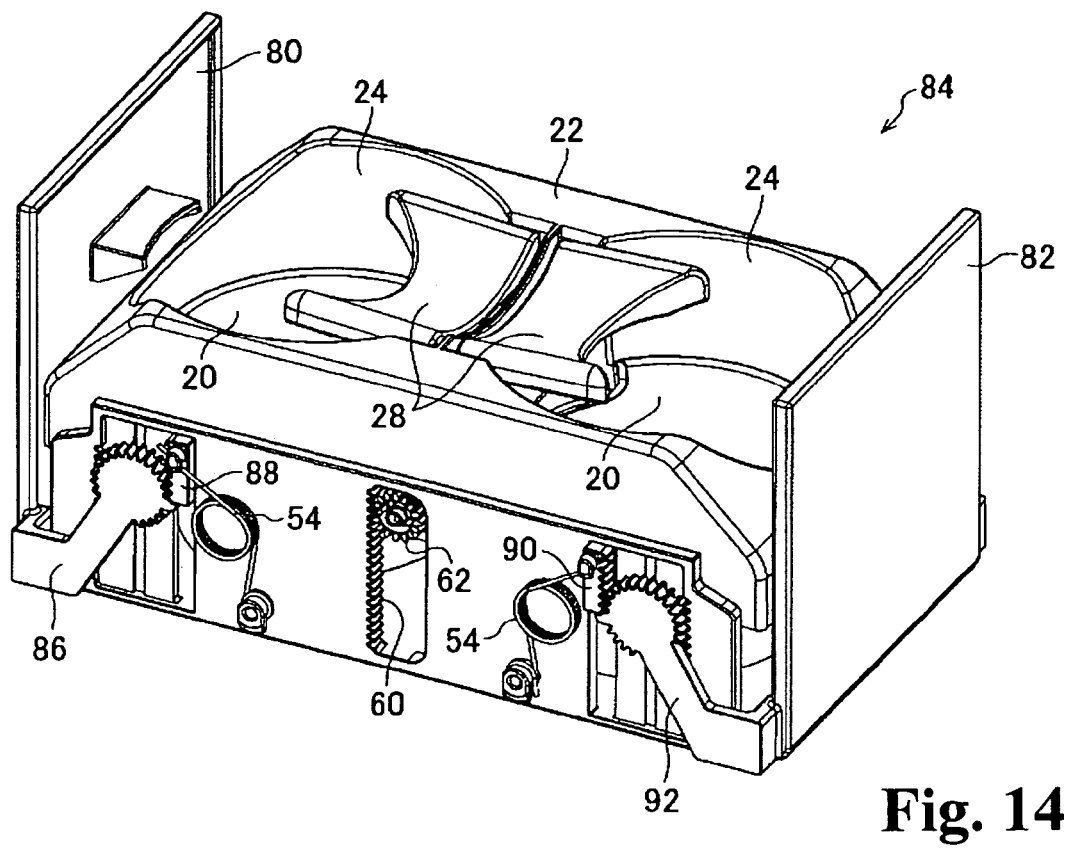
FIG. 14 is a perspective view showing a third modified example of the cup holder according to the present embodiment.

Moreover, in the present embodiment, as shown in FIG. 2, the supporting arm 40 is provided in one end portion of the width direction of the lid body 36, and the lid body 36 which is opened with a focus on the supporting arm 40, i.e., a single-sliding-type lid body 36 was explained. However, as shown in FIG. 14, the present embodiment may be applied to a cup holder 84 provided with lid bodies 80, 82, i.e., a double-door-type lid bodies 80, 82.

In this case, through the side wall member 22, the lid body 80 and the lid body 82 interlock. Specifically, when the lid body 80 is moved in the opening direction, a supporting arm (conversion mechanism) 86 of the lid body 80 moves upward while the supporting arm 86 is rotating so as to move the side wall member 22 upward through a rack (second rack, conversion mechanism) 88. Thereby, while a supporting arm (conversion mechanism) 92 is rotating through a rack (second rack, conversion mechanism) 90, the supporting arm 92 moves upward, and the lid body 82 moves in the opening direction.

Incidentally, the side wall member 22 may be divided into two by corresponding to the lid bodies 80, 82. In this case, since the lid body 80 and the lid body 82 can be separately opened, the damper gear 62 is required for each side wall member. However, although the damper gear 62 is used all in the embodiment, provided that the side wall member 22 can be moved quietly, a buffer member and the like may be used in place of the damper gear 62.

As stated above, the present embodiment is just one embodiment, and obviously can be modified accordingly provided that it does not exceed the subject of the present invention.

What is claimed is:

1. A cup holder, comprising:
   a main body having a housing portion for housing a container;
   a lid body movably provided in the main body, and opening and closing an opening of the housing portion;
   a side wall member provided so as to be capable of moving up and down inside the housing portion, and supporting a side portion of the container housed inside the housing portion; and
   a conversion mechanism converting an opening and closing movement of the lid body to an up-and-down movement of the side wall member,
   wherein the conversion mechanism comprises:
   a supporting arm supporting the lid body;
   a first rack provided along a height direction of the main body, engaging a first gear provided in an end portion of the supporting arm, and opening and closing the lid body while the first gear is being rotated; and
   a second rack provided in the side wall member, engaging the first gear, and moving the side wall member up and down by a rotation of the first gear.

2. A cup holder according to claim 1, further comprising a reversing spring having one end portion attached to the main body, and the other end portion attached to the second rack, wherein when the lid body is opened at a predetermined angle or above, the reversing spring urges in a direction moving the second rack upward, and when the lid body is closed at the predetermined angle or less, the reversing spring urges in a direction moving the second rack downward.

3. A cup holder according to claim 1, further comprising a damper gear provided in the side wall member, and engaging with a third rack provided in the main body.

4. A cup holder according to claim 1, further comprising a locking mechanism which locks the lid body in the main body in a state wherein the lid body is closed, and releases a locked state and also urges in a direction opening the lid body when the lid body is pressed.

5. A cup holder, comprising:
   a main body having a housing portion for housing a container;
   a lid body movably provided in the main body, and opening and closing an opening of the housing portion;
   a side wall member provided so as to be capable of moving up and down inside the housing portion, and supporting a side portion of the container housed inside the housing portion; and
   a conversion mechanism converting an opening and closing movement of the lid body to an up-and-down movement of the side wall member,
   wherein in the housing portion, a cup portion supporting the container inside the side wall member is provided, and in the side wall member, a supporting piece, housed by abutting against the cup portion in a state wherein the lid body is closed, and projecting to a cup portion side by an opening movement of the lid body, is provided.

* * * * *